US012777363B2

(12) United States Patent
Liu et al.

(10) Patent No.: US 12,777,363 B2
(45) Date of Patent: Oct. 27, 2026

(54) METHOD FOR QUALITY OF EXPERIENCE AWARENESS TRANSMISSION

(71) Applicant: ZTE Corporation, Shenzhen (CN)

(72) Inventors: Zhuang Liu, Shenzhen (CN); Yin Gao, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 423 days.

(21) Appl. No.: 18/348,790

(22) Filed: Jul. 7, 2023

(65) Prior Publication Data

US 2023/0354089 A1 Nov. 2, 2023

Related U.S. Application Data

(63) Continuation of application No. PCT/CN2021/108647, filed on Jul. 27, 2021.

(51) Int. Cl.
*H04W 28/02* (2009.01)

(52) U.S. Cl.
CPC ... *H04W 28/0268* (2013.01); *H04W 28/0236* (2013.01)

(58) Field of Classification Search
CPC ...................... H04W 28/0268; H04W 28/0236
See application file for complete search history.

(56) References Cited

U.S. PATENT DOCUMENTS

| | | | | |
|---|---|---|---|---|
| 10,321,361 | B2 | 6/2019 | Senarath et al. | |
| 2013/0298170 | A1 | 11/2013 | ElArabawy et al. | |
| 2016/0105821 | A1 * | 4/2016 | Senarath | H04W 28/24 370/329 |
| 2019/0312791 | A1 | 10/2019 | Ligata et al. | |

FOREIGN PATENT DOCUMENTS

| | | | | |
|---|---|---|---|---|
| CN | 103959798 | A | 7/2014 | |
| CN | 109039495 | A | 12/2018 | |
| CN | 110178377 | A | 8/2019 | |
| WO | WO-2017175039 | A1 * | 10/2017 | H04L 47/24 |
| WO | WO-2020049181 | A1 * | 3/2020 | H04L 43/08 |

OTHER PUBLICATIONS

International Search Report and Written Opinion received for Application No. PCT/CN2021/108647 mailed Apr. 27, 2022 (7 pages).
Huawei HiSilicon, "Updates to "Solution 2.3: Content requirement Aware QoS Framework,"" SA WG2 Meeting #115, 82-162564, May 23-27, 2016 (13 pp.).
Extended European Search Report for Application No. EP 21 951 196.1 dated Jun. 28, 2024 (8 pages).

* cited by examiner

*Primary Examiner* — Suraj M Joshi
(74) *Attorney, Agent, or Firm* — Crowell & Moring LLP

(57) ABSTRACT

A wireless communication in a wireless network node includes receiving, from a core network, a quality of service (QoS) configuration for a wireless terminal and a quality of experience (QoE) policy associated with the QoS configuration. At least one data transmission between the wireless network node and the wireless terminal is performed based on the QoS configuration and the QoE policy.

20 Claims, 7 Drawing Sheets

METHOD FOR QUALITY OF EXPERIENCE AWARENESS TRANSMISSION

PRIORITY

This application claims priority as a Continuation of PCT/CN2021/108647, filed on Jul. 27, 2021, entitled "A METHOD FOR QUALITY OF EXPERIENCE AWARENESS TRANSMISSION", published as WO 2023/004580 A1, the entirety of which is incorporated herein by reference.

TECHNICAL FIELD

This document is directed generally to wireless communications, and in particular to quality of experience (QoE) awareness transmissions.

BACKGROUND

The quality of services (QoS) focuses on network performance metrics at a user side. A protocol data unit (PDU) session supports one or more QoS Flows. There is a one-to-one mapping between the QoS flow and the QoS configuration, i.e. all packets belonging to a specific QoS flow have the same QoS configuration. Note that the QoS configuration is a set of QoS characteristics which shall be fulfilled by the network (e.g. radio access network (RAN) node). For example, the QoS characteristics may comprise a priority level, a packet delay or a packet error rate, a guaranteed flow bit rate (GBR), a non-GBR and a delay critical GBR flows. When the PDU session is established for a user equipment (UE), the network signals the corresponding QoS configuration for each QoS flow to the RAN node and the RAN node takes the QoS configuration into account for data transmissions to the UE.

When scheduling the data transmissions, the RAN node may consider only the QoS configurations. However, the good QoS performance does not always lead to good user experience. How to improve the user experience is an important topic to be discussed.

SUMMARY

This document relates to methods, systems, and devices for QoE awareness transmission, and in particularly to methods, systems, and devices for performing transmissions based on QoE performance.

The present disclosure relates to a wireless communication method for use in a wireless network node. The method comprises receiving, from a core network, a QoS configuration for a wireless terminal and a QoE policy associated with the QoS configuration, wherein at least one data transmission between the wireless network node and the wireless terminal is performed based on the QoS configuration and the QoE policy.

Various embodiments may implement the following features:

In some embodiments, the QoE policy comprises at least one of: a QoE score target associated with at least one QoS flow or at least one service type; a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level; a priority of the at least one QoS flow or the at least one service type; a target guarantee indication, indicating whether the QoE policy must to be followed; a release indication, which indicates whether to release network resources associated with the QoE policy when the QoE policy cannot be followed; or a release type indication, which indicates the network resources being released when the QoE policy cannot be followed.

In some embodiments, the wireless communication method further comprises transmitting, to the core network, QoE assistance information, wherein the QoE assistance information comprises at least one of:

- a mapping list comprising at least one mapping pair of a QoE level and a QoS level,
- wherein the QoE level is associated with at least one of: a QoE level identifier, a service type, a codec rate, a QoE Score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level, and
- wherein the QoS level includes at least one of a 5G QoS identifier, 5QI, value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate;
- at least one guaranteed QoE level, which indicates the at least one QoE level is guaranteed based on a radio quality, or
- at least one guaranteed QoS level, which indicates at least one QoS level is guaranteed based on the radio quality.

In some embodiments, the at least one guaranteed QoE level is associated with at least one network slice.

In some embodiments, the at least one guaranteed QoS level is associated with at least one network slice.

In some embodiments, the wireless communication method further comprises transmitting, from a central unit of the wireless network node to a distributed unit of the wireless network node, the QoS configuration and the QoE policy.

In some embodiments, the wireless communication method further comprises determining a mapping list comprising at least one mapping pair of a QoE level and a QoS level,

- wherein the QoE level is associated with at least one of: a QoE level identifier, a service type, a codec rate, a QoE score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level, and
- wherein the QoS level includes at least one of a 5G QoS identifier, 5QI, value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate.

In some embodiments, the wireless communication method further comprises determining a QoS level based on the QoE policy and a mapping list comprising at least one mapping pair of a QoE level and a QoS level, and determining a recommended QoS configuration based on the determined QoS level, wherein the recommended QoS configuration is used for performing the at least one data transmission.

In some embodiments, the wireless communication method further comprises determining a recommended QoS configuration for a QoS flow or a service type based on a QoE score associated with the QoS flow or the service type and the QoE policy when the QoE score is smaller than a QoE score target of the QoE policy or at least one QoE measurement result received from the wireless terminal is smaller than a QoE metrics target of the QoE policy, wherein the QoE score associated with the QoS flow or the service type is determined based on the at least one QoE measurement result of the wireless terminal.

In some embodiments, the wireless communication method further comprises transmitting, to the core network, the recommended QoS configuration for the QoS flow or the service type; and receiving, from the core network, at least one accepted QoS flow for the recommended QoS configuration.

In some embodiments, the QoE score is determined by a distributed unit of the wireless network node and transmitted from the distributed unit to a central unit of the wireless network node and the recommended QoS configuration is determined by the central unit.

In some embodiments, the QoE score and the recommend QoS configuration are determined by a distributed unit of the wireless network node and transmitted from the distributed unit to a central unit of the wireless network node, and the central unit transmits the recommended QoS configuration to the core network.

In some embodiments, the wireless communication method further comprises:

- determining a QoE score of a QoS flow or a service type based on QoE measurement results received from the wireless terminal, or
- receiving, from the wireless terminal, a QoE server or the core network, the QoE score of the QoS flow or the service type.

In some embodiments, at least one data transmission between the wireless network node and the wireless terminal is reconfigured based on the QoE score and the QoE policy.

In some embodiments, a QoE score associated with a QoS flow or a service type is smaller than a QoE score target of the QoE policy or at least one QoE measurement result of the wireless terminal is smaller than a QoE metrics target of the QoE policy and the wireless communication method further comprises:

- releasing at least one network resources associated with the QoE score or the at least one QoE measurement result, or
- transmitting, to the core network, information of the at least one network resource associated with the QoE score or the at least one QoE measurement result, In some embodiments, the at least one network resource comprises at least one of a QoS flow, a protocol data unit session, or a data resource block.

In some embodiments, the information of the at least one network resource associated with the QoE score or the at least one QoE measurement result is transmitted from a distributed unit of the wireless network node to a central unit of the wireless network node and the central unit transmits the information of the at least one network resource associated with the QoE score or the at least one QoE measurement result to the core network.

In some embodiments, the at least one data transmission between the wireless network node and the wireless terminal is reconfigured by a distributed unit of the wireless network node.

In some embodiments, the QoE score is determined by the distributed unit of the wireless network node.

In some embodiments, the QoE score is determined by a central unit of the wireless network node and is transmitted from the central unit to the distributed unit.

In some embodiments, the QoE score is received by the distributed unit of the wireless network node from the wireless terminal, a QoE server or the core network.

In some embodiments, the QoE score is received by the central unit of the wireless network node from the wireless terminal, the QoE server or the core network.

In some embodiments, the wireless communication method further comprises:

- determining a QoE score of a service type based on QoE measurement results received from the wireless terminal;
- determining at least one configuration associated with the service type based on the QoE score and the QoE policy and
- transmitting, to the wireless terminal or a server of the service type, the at least one configuration.

In some embodiments, the at least one configuration comprises at least one of an encode rate or an allocated bandwidth.

The present disclosure relates to a wireless communication method for use in a core network. The method comprises transmitting, to a wireless network node, a QoS configuration for a wireless terminal and a QoE policy associated with the QoS configuration, wherein at least one data transmission between the wireless network node and the wireless terminal is performed based on the QoS configuration and the QoE policy.

Various embodiments may implement the following features:

In some embodiments, the QoE policy comprises at least one of:

- a QoE score target associated with at least one QoS flow or at least one service type,
- a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level,
- a priority of the at least one QoS flow or the at least one service type,
- a target guarantee indication, indicating whether the QoE policy must to be followed,
- a release indication, which indicates whether to release network resources associated with the QoE policy when the QoE policy cannot be followed, or
- a release type indication, which indicates the network resources being released when the QoE policy cannot be followed.

In some embodiments, the wireless communication method further comprises receiving, from the wireless network node, QoE assistance information, wherein the QoE assistance information comprises at least one of:

a mapping list comprising at least one mapping pair of a QoE level and a QoS level, wherein the QoE level is associated with at least one of: a QoE level identifier, a service type, a codec rate, a QoE Score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level, and wherein the QoS level includes at least one of a 5G QoS identifier,5QI, value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate;

at least one guaranteed QoE level, which indicates the at least one QoE level is guaranteed based on a radio quality, or at least one guaranteed QoS level, which indicates at least one QoS level is guaranteed based on the radio quality.

In some embodiments, the at least one guaranteed QoE level is associated with at least one network slice.

In some embodiments, the at least one guaranteed QoS level is associated with at least one network slice.

In some embodiments, the wireless communication method further comprises receiving, from the wireless network node, the recommended QoS configuration for a QoS flow or a service type; and transmitting, to the wireless network node, at least one accepted QoS flow for the recommended QoS configuration.

In some embodiments, the wireless communication method further comprises transmitting, to the wireless network node, a QoE score of a QoS flow or a service type.

In some embodiments, the wireless communication method further comprises receiving, from the wireless network node, information of at least one network resource associated with the QoE score or the at least one QoE measurement result, and releasing the at least one network resources associated with the QoE score or the at least one QoE measurement result, wherein the at least one network resource comprises at least one of a QoS flow, a protocol data unit session, or a data resource block.

The present disclosure relates to a wireless network node. The wireless network node comprises a communication unit, configured to receive, from a core network, a QoS configuration for a wireless terminal and a QoE policy associated with the QoS configuration, wherein at least one data transmission between the wireless network node and the wireless terminal is performed based on the QoS configuration and the QoE policy.

Various embodiments may implement the following feature:

In some embodiments, the wireless network node further comprises a processor configured to perform any of aforementioned wireless communication methods.

The present disclosure relates to a core network. The core network comprises a communication unit, configured to transmit, to a wireless network node, a QoS configuration for a wireless terminal and a QoE policy associated with the QoS configuration, wherein at least one data transmission between the wireless network node and the wireless terminal is performed based on the QoS configuration and the QoE policy.

Various embodiments may implement the following feature:

In some embodiments, the core network further comprises a processor configured to perform any of aforementioned wireless communication methods.

The present disclosure relates to a computer program product comprising a computer-readable program medium code stored thereupon, the code, when executed by a processor, causing the processor to implement a wireless communication method recited in any one of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

In order to understand experience of end to end customers, quality of experience (QoE) has attracted operators' attention. The QoE measurement may be defined based on different applications and measurements taking place at user equipment (UE) side application layer, which may include measurements of Round-trip time, Jitter duration, Corruption duration, Throughput, Initial playout delay for video, video resolution, buffer occupancy level, etc. This disclosure provides a method of ensuring the QoE performance for data transmissions.

Figure 1:
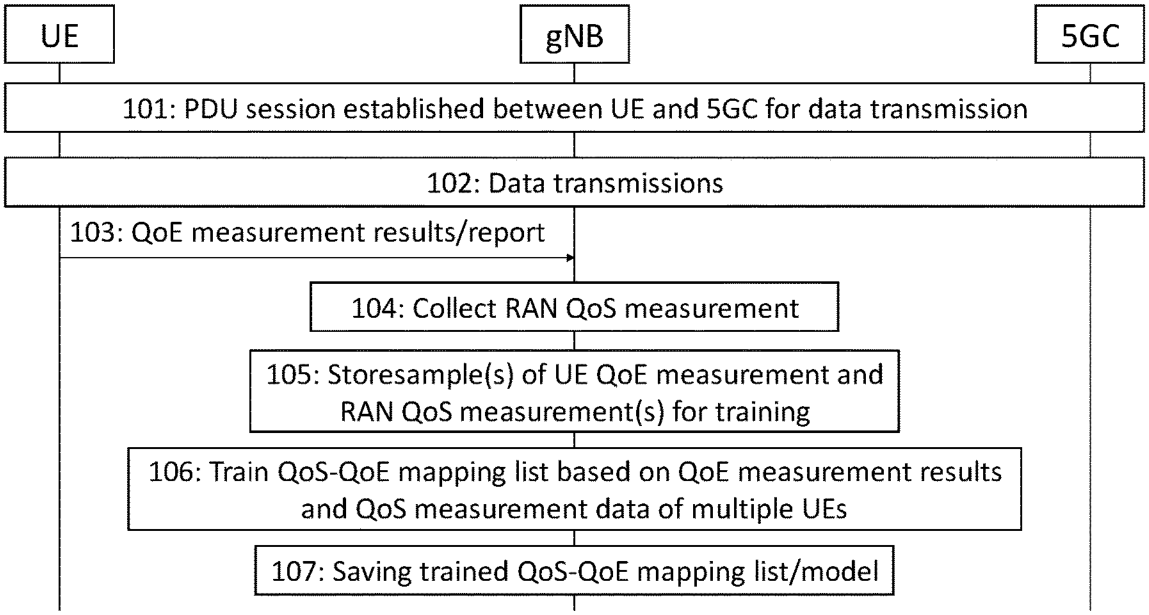
FIG. 1 shows a schematic diagram of a process related to QoE-QoS mapping according to an embodiment of the present disclosure.

FIG. 1 shows a schematic diagram of a process related to QoE-QoS mapping according to an embodiment of the present disclosure. The embodiment shown in FIG. 1 involves three network entities UE, gNB (e.g. RAN node) and 5G core network (5GC).

Specifically, in step 101, PDU session(s) is established between UE and 5GC for data transmissions.

In step 102, data of a service is transmitted between the UE and the 5GC via the gNB.

In step 103, the gNB receives QoE measurement report/results (of the service) from the UE.

In step 104, the gNB collects data related to RAN QoS measurement(s) for the service of the UE, The collected data may comprise at least one of a Packet Delay range, a maximum Packet Delay, a minimum Packet Delay, an average Packet Delay, a Packet Error Rate range, a maximum Packet Error Rate, a minimum Packet Error Rate, an average Packet Error Rate, a Packet Loss Rate range, a maximum Packet Loss Rate, a minimum Packet Loss Rate, an average Packet a Loss Rate, a Flow Bit Rate range, a maximum Flow Bit Rate, a minimum Flow Bit Rate, an average Flow Bit Rate.

In step 105, the gNB stores sample(s) of the UE QoE measurement report/results and the corresponding (data of) RAN QoS measurement(s), e.g., for training purpose.

In step 106, the gNB trains (e.g. determines) a QoS-QoE mapping list based on the QoE measurement report/results and the QoS measurement data of multiple UEs. For example, the gNB may train the QoS-QoE mapping list by using the QoE measurement results/report and the QoS measurement data of multiple UEs as input features of a machine learning function.

In an embodiment, the trained (e.g. determined) QoS-QoE mapping list is defined as:

QoE level and QoS level mapping list: a list of (QoE level, QoS level) mapping pairs. Each item (i.e. a pair of one QoE level and one QoS level) in the list allows a specific QoE level to be mapped to a specific QoS level. In other words, each item in the QoE-QoS mapping list allows one QoS level to be retrieved (e.g. determined, acquired) by looking up one QoE level in the QoS-QoE mapping list.

In an embodiment, the QoE level may be expressed by or comprise at least one of the following items: a QoE level identifier, a service type, a Codec rate, a QoE score, a QoE metrics range, a maximum QoE metrics, a minimum QoE metrics, an average QoE metrics. The QoE score could be a number range, e.g., from 0 to 10. where 10 represents excellent quality and 0 represents poor quality. As an alternative, the QoE score could be an enumerated type indicating a QoE quality, e.g., poor, medium, good. The QoE metrics is a subset of QoE metrics data guaranteed for the UE, e.g., a Round-trip time, a Jitter duration, a Corruption duration, a throughput, an initial playout delay for video, a video resolution, a buffer occupancy level, etc.

In an embodiment, the QoS level includes at least one of the following items: the 5G QoS identifier (5QI) reference or the QoS level identifier, the Service Type, the Packet Delay range, the maximum Packet Delay, the minimum Packet Delay, the average Packet Delay, the Packet Error Rate range, the maximum Packet Error Rate, the minimum Packet Error Rate, the average Packet Error Rate, the Packet Loss Rate range, the maximum Packet Loss Rate, the minimum Packet Loss Rate, the average Packet Loss Rate, the Guaranteed Flow Bit Rate range, the maximum Guaranteed Flow Bit Rate, the minimum Guaranteed Flow Bit Rate, or the average Guaranteed Flow Bit Rate.

In step 107, the gNB saves the trained QoS-QoE mapping list/model.

Figure 2:
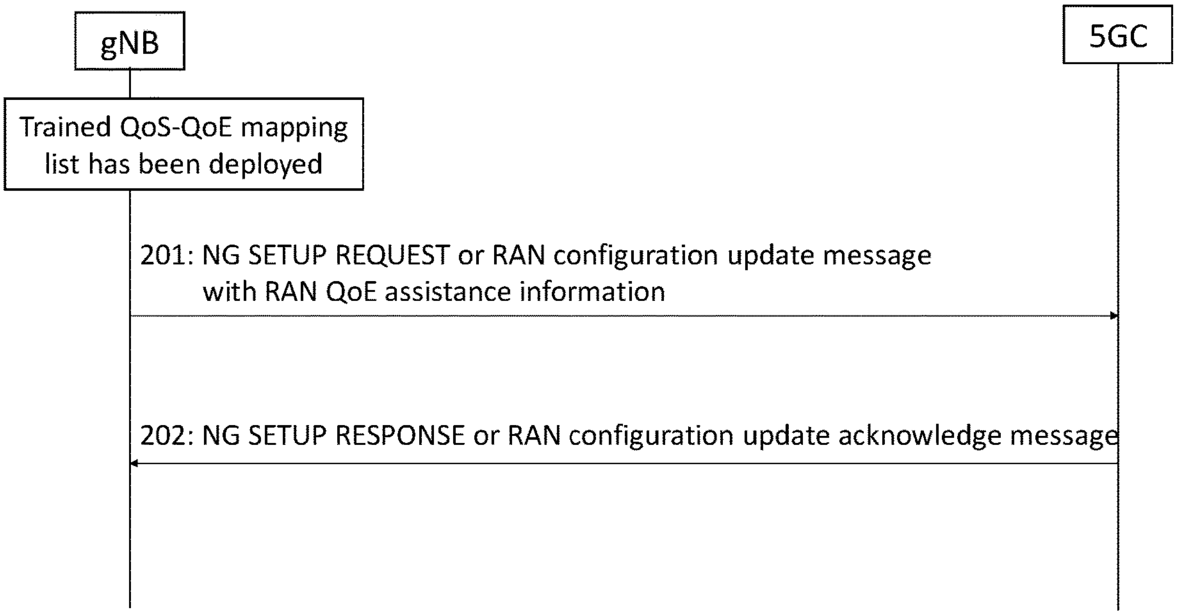
FIG. 2 shows a schematic diagram of a process according to an embodiment of the present disclosure.

FIG. 2 shows a schematic diagram of a process according to an embodiment of the present disclosure. In FIG. 2, the 5GC receives RAN QoE assistance information, e.g., during an NG interface setup/modification procedure. For example, after the trained QoS-QoE mapping list model has been deployed at the gNB, the gNB may send the deployed QoS-QoE mapping list (with other information) to the 5GC for optimizing the QoS configuration.

Specifically, in step 201, the gNB sends an NG SETUP REQUEST or a RAN configuration update message to the 5GC to setup or modify the interface between the gNB and the 5GC, where the gNB may include the RAN QoE assistance information in this message. In an embodiment, the RAN QoE assistance information includes at least one of the following items:

A) QoE level and QoS level mapping list (e.g. a list of the (QoE level, QoS level) mapping pairs). Each item in the list (e.g. one QoE level/QoS level pair) allows one QoE level to be mapped to one QoS level. That is, the mapping list allows a specific QoS level to be acquired by looking up the mapped QoE level in the mapping list.

In an embodiment, the QoE level may be expressed by or comprise at least one of the following items: the QoE level identifier, the service type, the Codec rate, the QoE score, the QoE metrics range, the maximum QoE metrics, the minimum QoE metrics, the average QoE metrics. The QoE score could be a number range, e.g., from 0 to 10. where 10 represents excellent quality and 0 represents poor quality. As an alternative, the QoE score could be an enumerated type indicating a QoE quality, e.g., poor, medium, good. The QoE metrics is a subset of QoE metrics data guaranteed for the UE, e.g., the Round-trip time, the Jitter duration, the Corruption duration, the Throughput, the Initial playout delay for video, the video resolution, the buffer occupancy level, etc.

In an embodiment, the QoS level includes at least one of the following items: the 5QI reference or the QoS level identifier, the Service Type, the Packet Delay range, the maximum Packet Delay, the minimum Packet Delay, the average Packet Delay, the Packet Error Rate range, the maximum Packet Error Rate, the minimum Packet Error Rate, the average Packet Error Rate, the Packet Loss Rate range, the maximum Packet Loss Rate, the minimum Packet Loss Rate, the average Packet Loss Rate, the Guaranteed Flow Bit Rate range, the maximum Guaranteed Flow Bit Rate, the minimum Guaranteed Flow Bit Rate, the average Guaranteed Flow Bit Rate.

B) QoE guaranteed information for one or more QoE levels and optionally for recommend slice ID(s) for the specific QoE level(s). The QoE guaranteed information indicates certain QoE level(s) that RAN can guarantee based on the current resource/radio quality to the core network. As an alternative or in addition, the QoE guaranteed information may indicate recommended (network) slice(s) (e.g. slice ID(s)) associated with the indicated QoE level(s).

C) QoS guaranteed information for one or more QoS levels and optionally for recommend slice ID(s) of the specific QoS level(s). The QoS guaranteed information indicates certain QoS level(s) that RAN can guarantee based on the current resource/radio quality to the core network. As an alternative or in addition, the QoS guaranteed information may indicate recommended Slice(s) (e.g. slice ID(s)) associated with the indicated QoS level(s).

In step 202, the 5GC receives the NG SETUP REQUEST or the RAN configuration update message and saves the received RAN QoE assistance information in the message. The 5GC responses an NG SETUP RESPONSE or a RAN configuration update acknowledge E message to the gNB.

Figure 3:
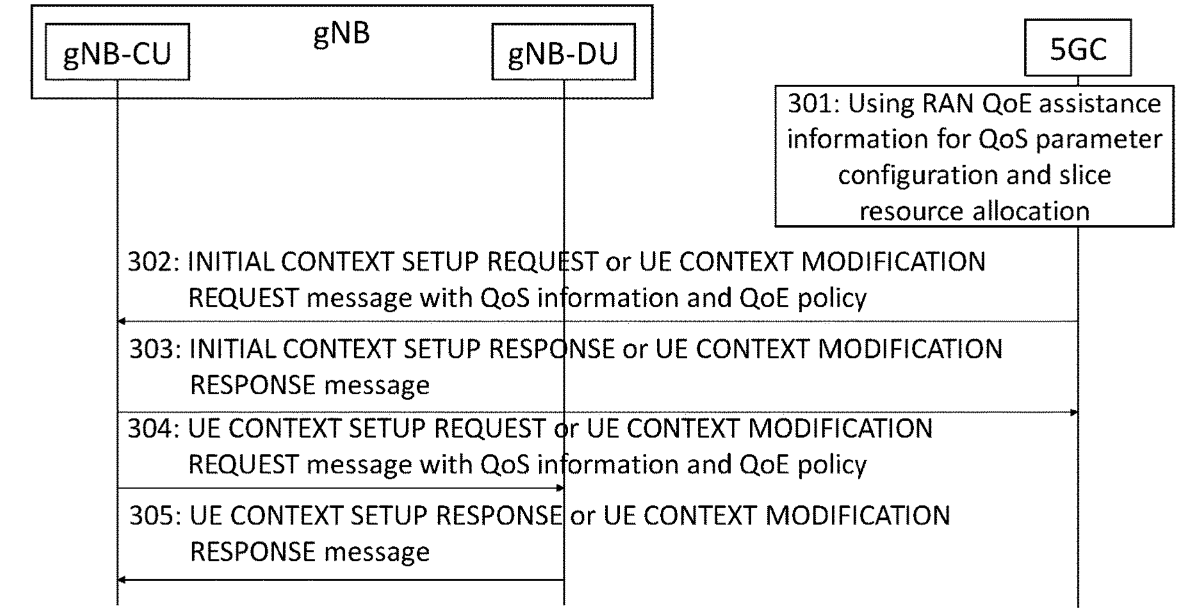
FIG. 3 shows a schematic diagram of a process of optimizing the QoS configuration according to an embodiment of the present disclosure.

FIG. 3 shows a schematic diagram of a process of optimizing the QoS configuration according to an embodiment of the present disclosure. In FIG. 3, the 5GC optimizes the QoS configuration during a PDU session setup/modification procedure by using RAN QoE assistance information. In addition, the gNB in FIG. 3 may be split to a central unit (CU) and a distributed unit (DU). That is, the gNB may be a CU/DU split gNB.

In detail, the 5GC may have saved the RAN QoE assistance information received from the gNB during the NG interface setup procedure (see, e.g., FIG. 2). The 5GC may use the received QoE assistance information in the subsequent PDU session setup/modify procedure.

In step 301, for a PDU session needed to be setup or modified for the UE, the 5GC may take the saved RAN QoE assistance information into account for the QoS parameters configuration and/or the slice resource allocation of the PDU session.

For example, the 5GC decides a QoE target for a specific service of the UE and configures appropriate QoS parameters for QoS flow(s) of the PDU session based on the decided QoE target and the QoE-QoS level mapping list (i.e. QoE assistance information). In an embodiment, if the QoE target is not in the RAN guaranteed QoE level list or the mapped QoS level of QoE target is not in the RAN guaranteed QoS level list, the 5GC assumes that the QoE target cannot be guaranteed by the RAN node and may reject the service request of the UE or release the PDU session of the UE; otherwise, the 5GC may decide the slice(s) associated with the determined QoE target based on the recommend slice ID(s) for the specific QoE/QoS level(s).

In step 302, the 5GC sends an INITIAL CONTEXT SETUP REQUEST or UE CONTEXT MODIFICATION REQUEST or PDU session setup/modify message to the gNB (e.g. gNB-CU), to setup or modify one or more PDU sessions for the UE. The sent message includes the QoS configuration and the QoE policy.

In an embodiment, the QoE policy includes at least one of the following items:

A) QoE score target of specific QoS flow and/or specific service type: The QoE score could be a number range, e.g., from 0 to 10, where 10 may represent excellent quality and 0 may represent poor quality. As an alternative, the QoE score could be an enumerated type to indicate the quality, e.g., poor, medium or good. This QoE score target indicates the QoE score that need to be guaranteed for the UE.

B) QoE metrics target of specific QoS flow and/or specific service type: The QoE metrics is a subset of QoE metrics data collection of UE, e.g., the round-trip time, the jitter duration, the corruption duration, the throughput, the initial playout delay for video, the video resolution, the buffer occupancy level, etc. This QoE metrics target indicates the QoE metrics that need to be guaranteed for the UE.

C) Priority of specific service or priority of specific QoS flow.

D) Target guarantee indication: This indication is used to indicate whether the QoE score target or QoE metrics target is a hard limit, i.e. whether the QoE score target or QoE metrics target must be guaranteed or is a target to be fulfilled as much as possible.

E) Release indication: The release indication is used to indicate whether to release a PDU session/QoS flow when the QoE score/metrics target of this PDU session/QoS flow or associated service type cannot be guaranteed.

F) Release type indication: The release type indication is used to indicate whether to release the entire PDU session, to release the corresponding QoS flow(s), or to release the QoS flow(s) related the associated services in the case that at least one QoE score/metrics target of a QoS flow or a service type cannot be guaranteed.

In step 303, the gNB (i.e. gNB-CU) saves the received QoS configuration and the QoE policy of the PDU session and sends the response message to the 5GC.

In an embodiment, the gNB maps individual QoS flow to one or more data resource blocks (DRB s) based on the received QoS configuration. The gNB may take the QoE policy into account for packet transmission scheduling, to fulfill the QoE score target and/or the QoE metrics target associated with the QoE policy for the UE. For example, based on the QoE policy, the gNB may increase or decrease the bandwidth, raise the priority of certain kinds of service to reduce delay of the service, etc.

In step 304, in the case of CU/DU split gNB, the gNB-CU sends a UE CONTEXT SETUP REQUEST or UE CONTEXT MODIFICATION REQUEST message to the gNB-DU, to setup or modify at least one radio bearer of the PDU session. For example, the message includes the QoS configuration and the QoE policy.

In step 305, the gNB-DU saves the received QoS configuration and the QoE policy and sends the response message to the gNB-CU.

In an embodiment, the gNB-DU may take the QoE policy into account for packet transmission scheduling of the UE, to fulfill the QoE score target and/or the QoE metrics target in the QoE policy for the UE. For instance, for fulfilling the QoE score target and/or the QoE metrics target, the gNB-DU may increase or decrease the bandwidth, increase the priority of some kinds of service to reduce delay, etc.

Figure 4:
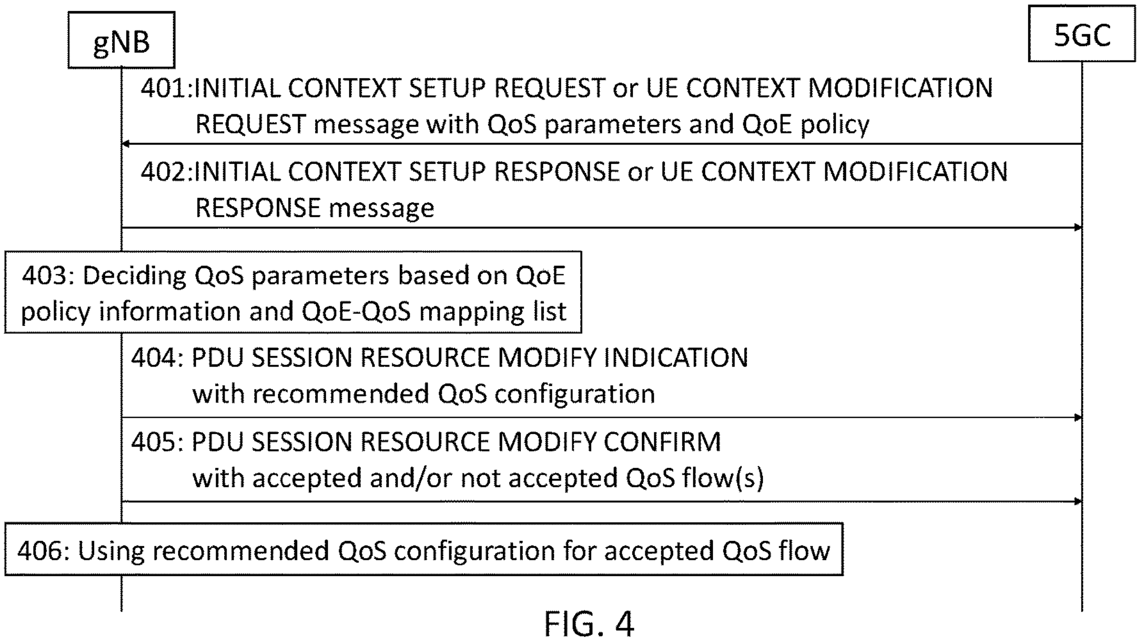
FIG. 4 shows a schematic diagram of a process of optimizing the QoS configuration according to an embodiment of the present disclosure.

FIG. 4 shows a schematic diagram of a process of optimizing the QoS configuration according to an embodiment of the present disclosure. In FIG. 4, the gNB optimizes the QoS configuration, e.g. during a PDU session setup/modification procedure.

Step 401: The 5GC sends an INITIAL CONTEXT SETUP REQUEST or a UE CONTEXT MODIFICATION REQUEST or a PDU session setup/modify message to the gNB (e.g. gNB-CU) to setup or modify one or more PDU sessions for the UE. The message includes the QoS configuration and the associated QoE policy. The details of QoE policy can be referred to above and are not narrated herein for brevity.

Step 402: The gNB saves the received QoS configuration and the QoE policy of the PDU session and sends the response message to the 5GC.

Step 403: The gNB retrieves/decides/determines a specific QoS level from the QoE-QoS level mapping list based on the received QoE target in the QoE policy and decides the appropriate QoS parameters for the QoS flow of the PDU session based on the retrieved/decided/determined QoS level.

Step 404: The gNB sends the PDU SESSION RESOURCE MODIFY INDICATION message to the 5GC, where the message includes the recommended QoS configuration, e.g., for specific QoS flow(s).

Step 405: The 5GC responses the PDU SESSION RESOURCE MODIFY CONFIRM message to the gNB, where the message includes information indicating accepted QoS flow(s) and/or not accepted QoS flow(s) for the recommended QoS configuration.

Step 406: The gNB receives the accepted and/or not accepted QoS flow(s) and uses the corresponding recommended QoS configuration for the accepted QoS flow. In an embodiment, the gNB remaps individual QoS flows to one more DRBs based on the updated QoS configuration.

Figure 5:
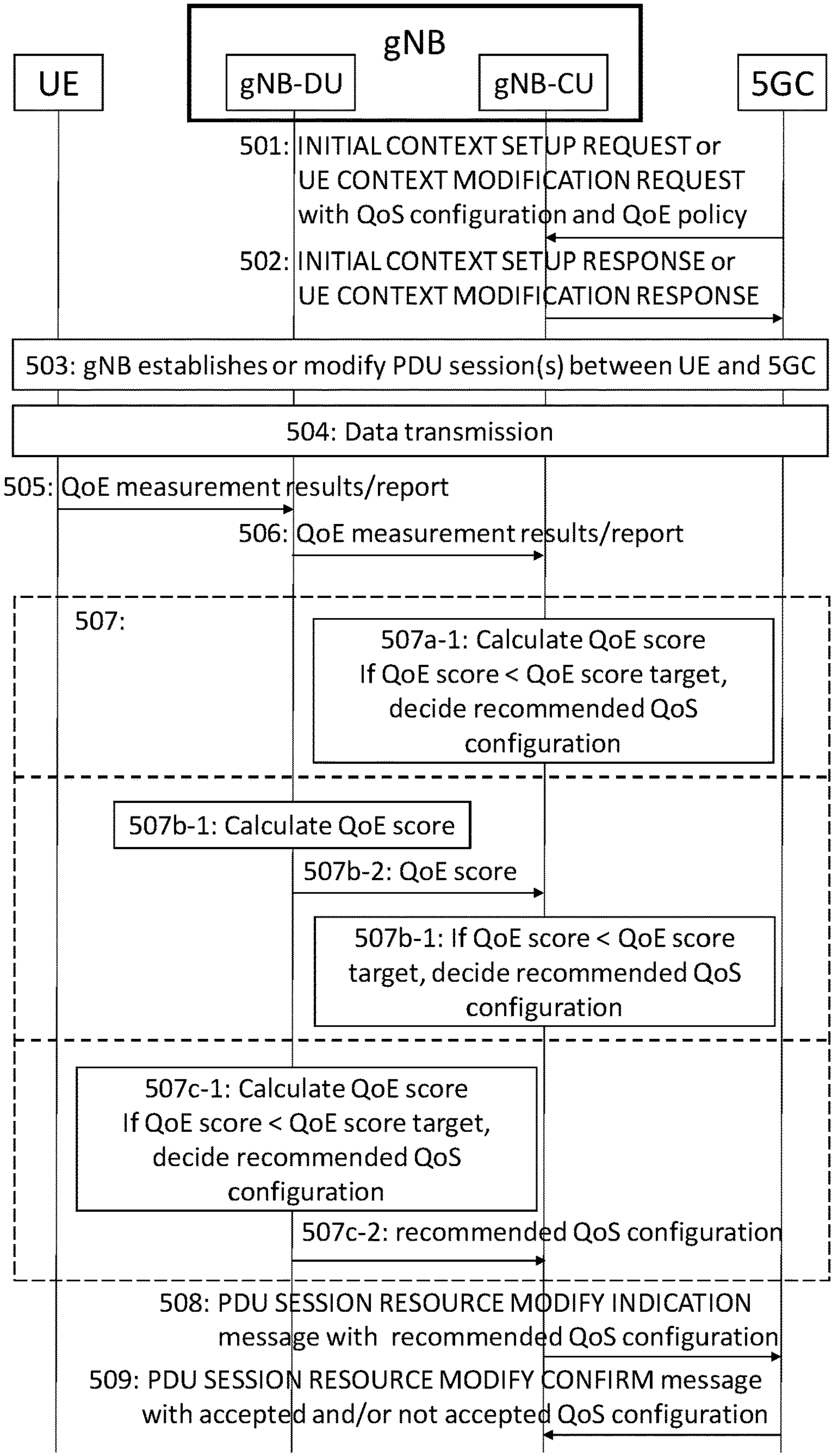
FIG. 5 shows a schematic diagram of optimizing the QoS configuration according to an embodiment of the present disclosure.

FIG. 5 shows a schematic diagram of optimizing the QoS configuration according to an embodiment of the present disclosure. In FIG. 5, the gNB optimizes the QoS configuration during the data transmissions.

Step 501: The 5GC sends an INITIAL CONTEXT SETUP REQUEST or a UE CONTEXT MODIFICATION REQUEST or a PDU session setup/modify message to the gNB (e.g. gNB-CU) to setup or modify one or more PDU sessions for the UE. The message includes the QoS configuration and the QoE policy. Note that detail of the QoE policy can be referred to the above embodiments and are not described herein for brevity.

Step 502: The gNB (i.e. gNB-CU) saves the received QoS configuration and the QoE policy of the PDU session(s). The gNB(gNB-CU) sends the response message to the 5GC.

Step 503: The gNB establishes or modifies the PDU session(s) based on the received QoS parameters of PDU session between UE and 5GC for data transmissions.

Step 504: Data of service is transmitted between UE and the 5GC via the gNB.

Steps 505 and 506: The gNB receives QoE measurement report(s) from the UE. In an embodiment of the CU/DU split gNB, the gNB-DU receives the QoE measurement report(s) from the UE in step 505 and gNB-DU forwards the QoE measurement report(s) to the gNB-CU in step 506.

Step 507: The gNB calculates a QoE score of specific QoS flow or specific service type based on the received QoE measurement report(s) from the UE. The QoE score may be a number range, e.g., from 0 to 10. where 10 represents excellent quality and 0 represents poor quality, or QoE score could be an enumerated type to indicate the quality, e.g., poor, medium, good. If the QoE score for the specific QoS flow or specific service type is below the corresponding QoE score target in the saved QoE policy, or the QoE measurements results of specific QoS flow or specific service type cannot fulfill the corresponding QoE metrics target within the saved QoE policy, the gNB retrieves an specific QoS level from the QoE-QoS level mapping list by looking up the QoE score/metrics target in the QoE policy and accordingly decides the appropriate QoS parameters for the QoS flow of the PDU session based on the retrieved QoS level.

In the embodiment of the CU/DU split gNB, step 507 can be achieved by three alternatives:

Alternative 1

Step 507*a*-1: The gNB-CU calculates the QoE score of the specific QoS flow or specific service type based on the received QoE measurement report. In an embodiment, if the QoE score for the specific QoS flow or specific service type is below the corresponding QoE score target in the saved QoE policy and/or the QoE measurements results of the specific QoS flow or specific service type do not reach the corresponding QoE metrics target within the saved QoE policy, the gNB-CU retrieve an specific QoS level from the QoE-QoS level mapping list by looking up the QoE score target and/or QoE metrics target within the QoE policy and determines appropriate QoS parameters for the QoS flow of the PDU session based on the retrieved QoS level.

Alternative 2

Step 507*b*-1: The gNB-DU calculates the QoE score of specific QoS flow or specific service type based on the received QoE measurements results Step 507*b*-2: The gNB-DU sends the calculated QoE score to the gNB-CU.

Step 507*b*-3: If the received QoE score for the specific QoS flow or specific service type is below the corresponding QoE score target within the saved QoE policy or the QoE measurements results of specific QoS flow or specific service type cannot fulfill the corresponding QoE metrics target within the saved QoE policy, the gNB-CU retrieves a QoS level from the QoE-QoS level mapping list based on the QoE target within the QoE policy and decides the appropriate QoS parameters for the QoS flow of the PDU session based on the retrieved QoS level.

Alternative 3

Step 507*c*-1: The gNB-DU calculates the QoE score of specific QoS flow or specific service type based on the received QoE measurement results from the UE. If the received QoE score for the specific QoS flow or specific service type is below the corresponding QoE score target within the saved QoE policy or the QoE measurements results of specific QoS flow or specific service type cannot fulfill the corresponding QoE metrics target within the saved QoE policy, the gNB-DU retrieves a QoS level from the QoE-QoS level mapping list based on the QoE target within the QoE policy and decides the appropriate QoS parameters for the QoS flow of the PDU session based on the retrieved QoS level.

Step 507*c*-2: The gNB-DU sends the recommended QoS parameters for the specific QoS flow to the gNB-CU.

Step 508: The gNB (i.e. gNB-CU) sends the PDU SESSION RESOURCE MODIFY INDICATION message to the 5GC, where the message includes the recommended QoS configuration for the specific QoS flow.

Step 509: The 5GC responses the PDU SESSION RESOURCE MODIFY CONFIRM message to the gNB (i.e. gNB-CU), wherein the message includes accepted and not accepted QoS configuration (e.g. accepted and not accepted QoS flow(s)). The gNB (gNB-CU) uses the corresponding recommended QoS configuration for the accepted QoS flow(s). Note that the gNB may remap individual QoS flows to one or more DRBs based on the updated QoS configuration.

Figure 6:
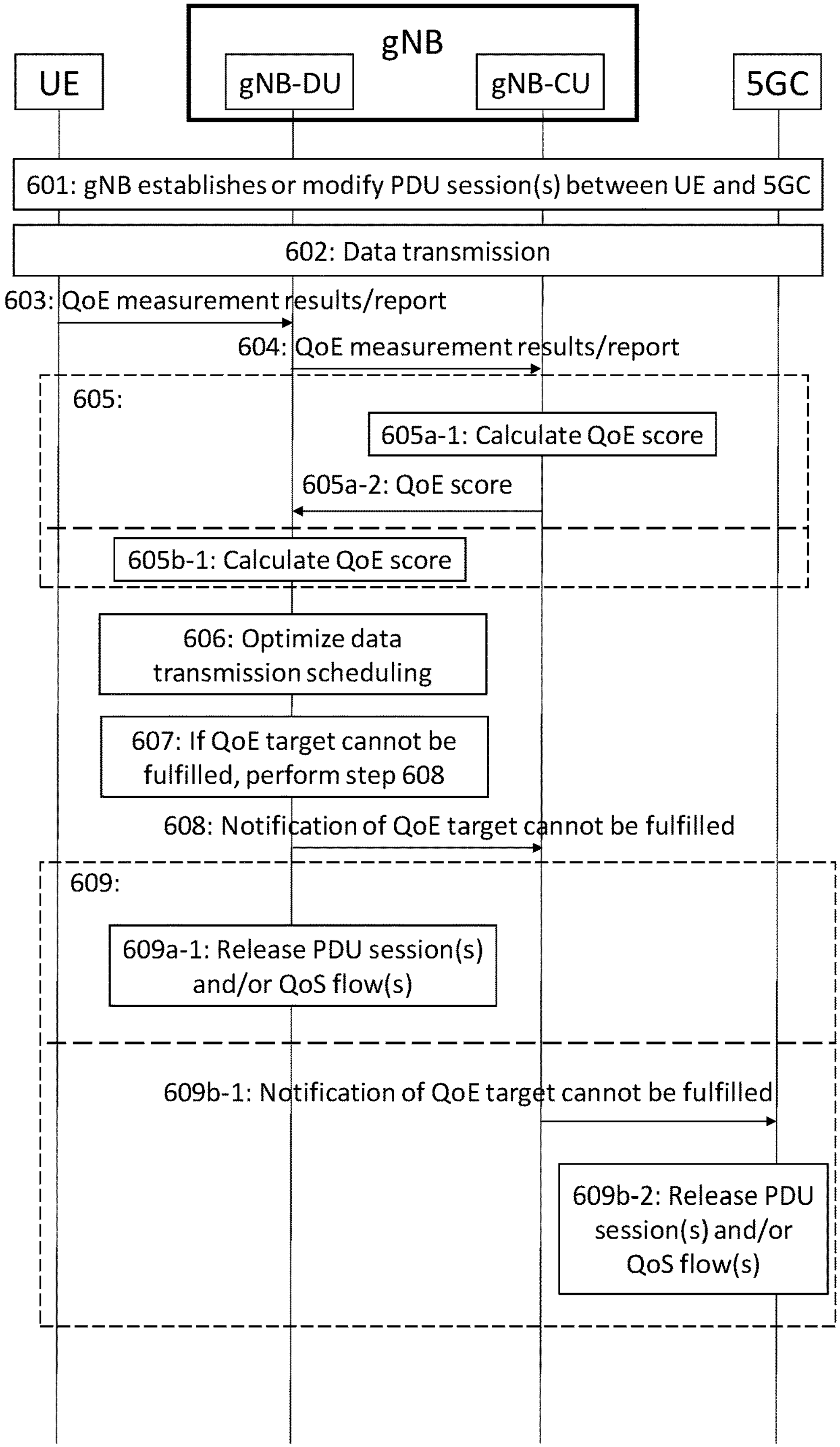
FIG. 6 shows a schematic diagram of a process according to an embodiment of the present disclosure.

FIG. 6 shows a schematic diagram of a process according to an embodiment of the present disclosure. In FIG. 6, the QoE score target and/or the QoE metrics target may not be achieved.

Step 601: PDU session(s) between UE and 5GC is established and/or modified for data transmissions.

Step 602: Data of service are transmitted between UE and the 5GC via the gNB.

Steps 603 and 604: The gNB receives QoE measurements report (e.g. QoE measurement results) from the UE. In an embodiment of CU/DU split gNB, the gNB-DU receives the QoE measurement report from the UE in step 603 and the gNB-DU forwards the QoE measurement report to the gNB-CU in step 604.

Step 605: The gNB calculates the QoE score of specific QoS flow or specific service type based on the received QoE measurements results from the UE. The QoE score is defined as above embodiments.

In the case of the CU/DU split gNB, step 605 may be implemented by 2 alternatives.

Alternative 605*a*

Step 605*a*-1: The gNB-CU calculates the QoE score of specific QoS flow or specific service type based on the received QoE measurements results. As an alternative or in addition, the gNB-CU receives the QoE score of the specific QoS flow or the specific service type within the QoE measurements results/report from the UE. In an embodiment, the gNB-CU may receive the QoE score of specific QoS flow or specific service type from a QoE server directly or via core network.

Step 605*a*-2: The gNB-CU sends the calculated QoE score to the gNB-DU.

Alternative 605*b*

Step 605*b*-1: The gNB-DU calculates the QoE score of specific QoS flow or specific service type based on the received QoE measurements results. As an alternative or in addition, the gNB-DU receives the QoE score of the specific QoS flow or the specific service type within the QoE measurements results/report from the UE.

Step 606: The gNB takes the QoE policy and calculated QoE score into account for packet transmission scheduling. For example, based on the QoE policy and calculated QoE score, the gNB may increase or decrease the bandwidth, improve the priority of some kinds of service to reduce delay, etc.

In the embodiment of the CU/DU split gNB, the step 606 is performed by the gNB-DU.

In the embodiment of the CU/DU split gNB, steps 607 and 608 are performed: If the gNB-DU determines that subsequent optimizations of scheduling cannot make the QoE score meet the QoE score target in the QoE policy (e.g., if the QoE score for the specific QoS flow or specific service type is below the Corresponding QoE score target within the QoE policy or the QoE measurements results of specific QoS flow or specific service type cannot fulfill the corresponding QoE metrics target within the saved QoE policy, the gNB-DU notifies the gNB-CU that the QoE score target and/or the QoE metrics target cannot be reached. In an embodiment, the notification of the QoE score target and/or the QoE metrics target cannot be reached comprises at least one of QoS flow ID(s), PDU session ID(s), DRB ID(s) associated with the not reached QoE score target and/or QoE metrics target.

Step 609: When the gNB determines that subsequent optimizations of scheduling cannot make the subsequent QoE score and/or the QoE subsequent metrics reach the QoE score target and/or the QoE metrics target in the QoE policy, a PDU session management procedure may be performed, wherein the PDU session management procedure comprises step 609*a*-1 or steps 609*b*-1 and 609*b*-2.

Step 609*a*-1: The gNB (i.e. gNB-CU) releases the PDU session(s) and/or QoS flow(s) and/or the DRB(s) associated with the not reached QoE score target and/or QoE metrics target by performing corresponding release procedure.

Step 609*b*-1: The gNB (gNB-CU) sends a notification to the 5GC, the notification includes at least one of QoS flow ID(s), PDU session ID(s), DRB ID(s) associated with the not reached QoE score target and/or QoE metrics target.

In step 609*b*-2: The 5GC decides to release the PDU session(s) and/or QoS flow(s) and/or the DRB(s) associated with the not reached QoE score target and/or QoE metrics target and triggers the corresponding release procedure.

Figure 7:
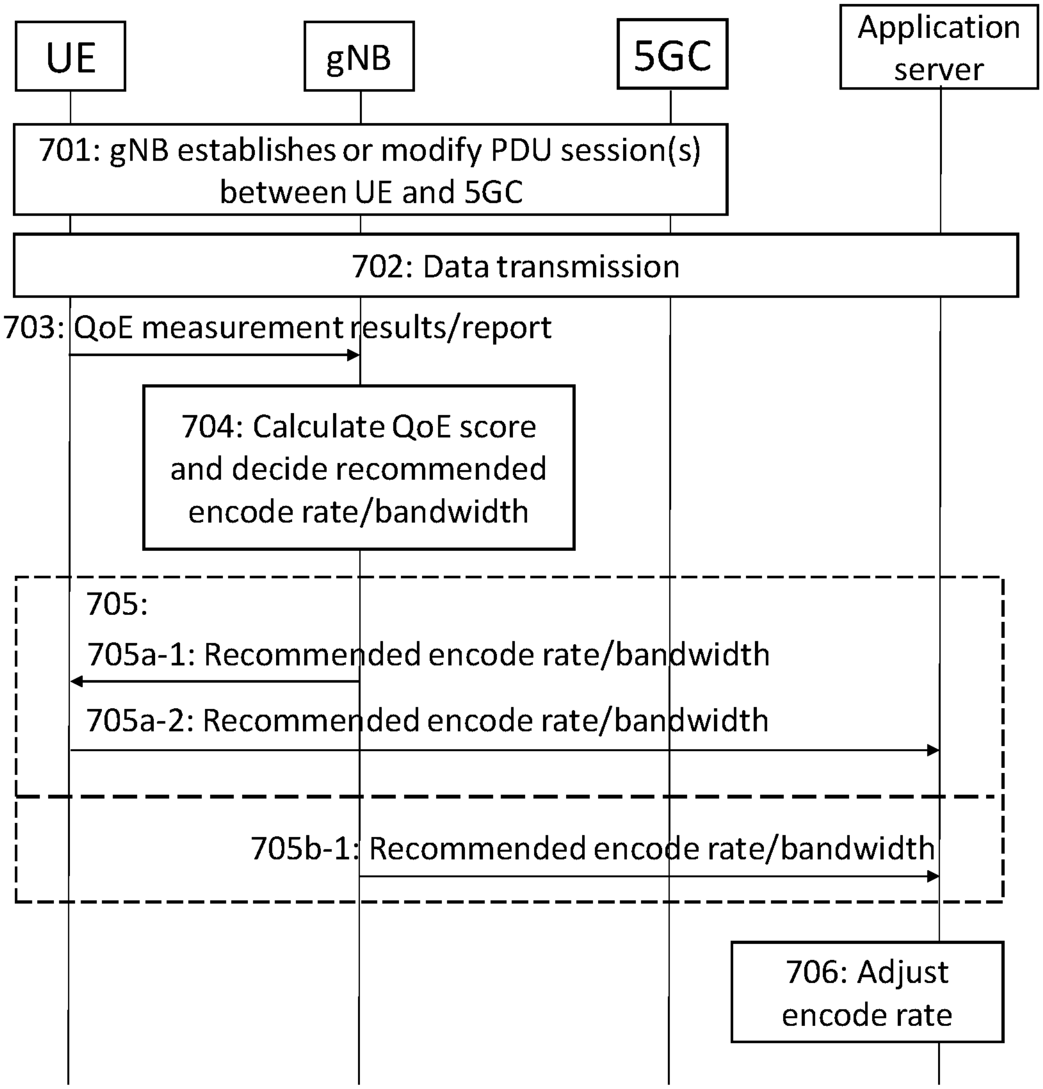
FIG. 7 shows a schematic diagram of a process according to an embodiment of the present disclosure.

FIG. 7 shows a schematic diagram of a process according to an embodiment of the present disclosure. In FIG. 7, the QoE quality is ensured for video transmissions. Nowadays, certain applications, such as video streaming services, IP multimedia sub-system (IPS), voice-over-IP (VoIP), etc., may support multiple encode rates. The variable range of bitrates allows these types of application to choose an appropriate encode rate for transmitting data. Encode rate adaptation is used to optimize the perceived transmission quality of the application. When the service provider (e.g. application server) needs to adjust the encode rate because detecting that the data delay or that the throughput is too large or too low in the application layer, however, the service provide does not know whether the network side optimizes the data transmission by increasing or decreasing the bandwidth. The QoE quality target may be achieved by either the service provider adjusting the encoding rate or the network side optimizing the data transmission. That is, to achieve the QoE quality target, the service provider may not need to adjust the encoding rate if the network side optimizes the data transmission, and vice versa. In an embodiment, the encode rate adjusting by the network side (e.g. gNB) may achieve better performance on improving QoE quality and avoid wasting network resources.

Specifically, in step 701, the PDU session(s) between the UE and 5GC is established and/or modified for data transmissions. Note that the PDU session is configured with QoE policy.

In step 702, data of service is transmitted between the UE and the 5GC via the gNB.

In step 703, the gNB receives the QoE measurements report from the UE.

In step 704, the gNB calculates QoE score of specific QoS flow or specific service type based on the received QoE measurements results from the UE, the QoE score is same defined as above embodiment. The gNB decides a recommended encode rate and/or the updated bandwidth used for the service based on the QoE score and QoE target within QoE policy.

In step 705, the gNB sends the recommended encode rate and allocated bandwidth to the application server, e.g. a video server. FIG. 7 shows two alternatives for implementing step 705:

Alternative 1

In step **705*a*-1**, the gNB sends at least one of the following information to the UE: a recommend encode or the allocated bandwidth.

In step **705*a*-2**, the application layer of the UE forwards the received recommend encode and/or received allocated bandwidth to the application server.

Alternative 2

In step **705*b***, the gNB sends at least one of the following information to the application server: a recommended encode rate or the allocated bandwidth.

In step 706: the application server adjusts the encode rate based on the received recommender encode rate and/or the received allocated bandwidth.

Figure 8:
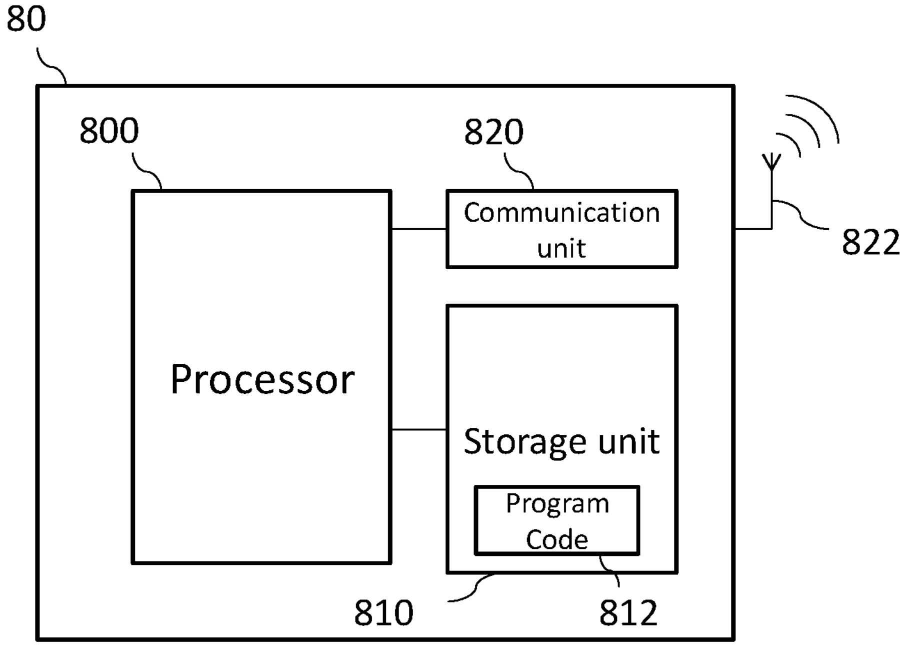
FIG. 8 shows an example of a schematic diagram of a wireless terminal according to an embodiment of the present disclosure.

FIG. 8 relates to a schematic diagram of a wireless terminal 80 according to an embodiment of the present disclosure. The wireless terminal 80 may be a user equipment (UE), a mobile phone, a laptop, a tablet computer, an electronic book or a portable computer system and is not limited herein. The wireless terminal 80 may include a processor 800 such as a microprocessor or Application Specific Integrated Circuit (ASIC), a storage unit 810 and a communication unit 820. The storage unit 810 may be any data storage device that stores a program code 812, which is accessed and executed by the processor 800. Embodiments of the storage unit 812 include but are not limited to a subscriber identity module (SIM), read-only memory (ROM), flash memory, random-access memory (RAM), hard-disk, and optical data storage device. The communication unit 820 may a transceiver and is used to transmit and receive signals (e.g. messages or packets) according to processing results of the processor 800. In an embodiment, the communication unit 820 transmits and receives the signals via at least one antenna 822 shown in FIG. 8.

In an embodiment, the storage unit 810 and the program code 812 may be omitted and the processor 800 may include a storage unit with stored program code.

The processor 800 may implement any one of the steps in exemplified embodiments on the wireless terminal 80, e.g., by executing the program code 812.

The communication unit 820 may be a transceiver. The communication unit 820 may as an alternative or in addition be combining a transmitting unit and a receiving unit configured to transmit and to receive, respectively, signals to and from a wireless network node (e.g. a base station).

Figure 9:
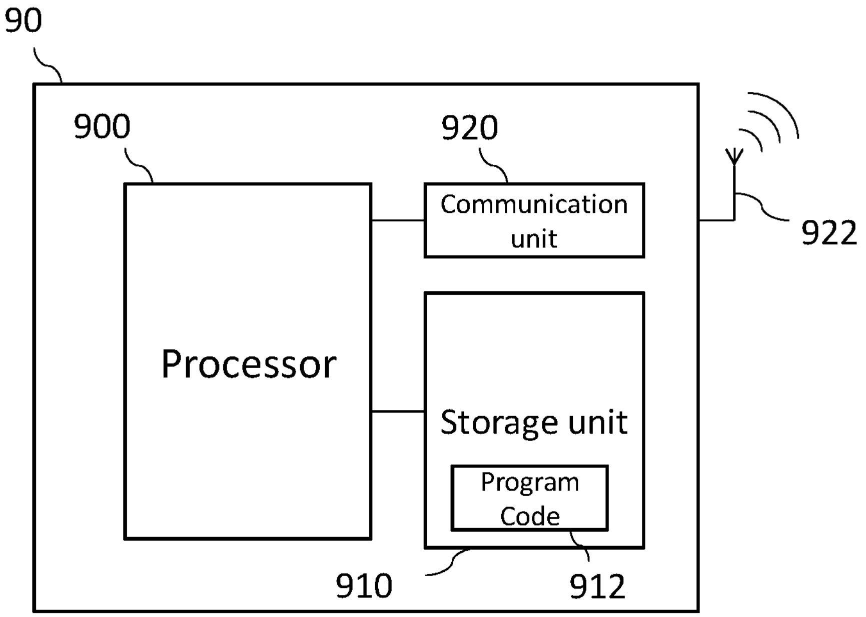
FIG. 9 shows an example of a schematic diagram of a wireless network node according to an embodiment of the present disclosure.

FIG. 9 relates to a schematic diagram of a wireless network node 90 according to an embodiment of the present disclosure. The wireless network node 90 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 90 may comprise (perform) at least one network function such as an access and mobility management function (AMF), a session management function (SMF), a user place function (UPF), a policy control function (PCF), an application function (AF), etc. The wireless network node 90 may include a processor 900 such as a microprocessor or ASIC, a storage unit 910 and a communication unit 920. The storage unit 910 may be any data storage device that stores a program code 912, which is accessed and executed by the processor 900. Examples of the storage unit 912 include but are not limited to a SIM, ROM, flash memory, RAM, hard-disk, and optical data storage device. The communication unit 920 may be a transceiver and is used to transmit and receive signals (e.g. messages or packets) according to processing results of the processor 900. In an example, the communication unit 920 transmits and receives the signals via at least one antenna 922 shown in FIG. 9.

In an embodiment, the storage unit 910 and the program code 912 may be omitted. The processor 900 may include a storage unit with stored program code.

The processor 900 may implement any steps described in exemplified embodiments on the wireless network node 90, e.g., via executing the program code 912.

The communication unit 920 may be a transceiver. The communication unit 920 may as an alternative or in addition be combining a transmitting unit and a receiving unit configured to transmit and to receive, respectively, signals to and from a wireless terminal (e.g. a user equipment or another wireless network node).

Figure 10:
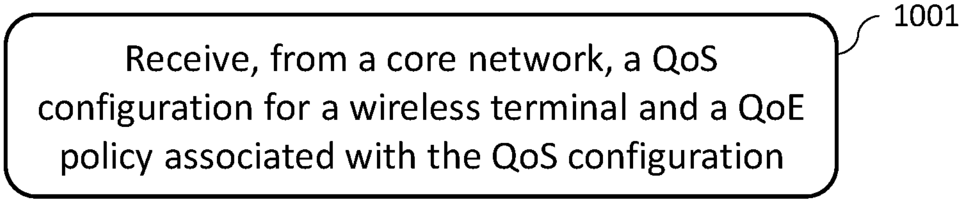
FIG. 10 shows a flowchart of a method according to an embodiment of the present disclosure.

FIG. 10 shows a schematic diagram of a method according to an embodiment of the present disclosure. The method shown in FIG. 10 may be used in a wireless network node (e.g. gNB or RAN node) and comprises the following step:

Step 1001: Receive, from a core network, a QoS configuration for a wireless terminal and a QoE policy associated with the QoS configuration.

In FIG. 10, the wireless network node receives not only a QoS configuration for a wireless terminal (e.g. UE) but also a QoE policy associated with the QoS configuration from a core network (e.g. 5GC). In an embodiment, the QoE policy is associated with the wireless terminal. As an alternative or in addition, the QoE policy is associated with PDU session(s), QoS flow(s), service(s) or application(s) of the wireless terminal. The wireless network node performs data transmissions with the wireless terminal based on the received QoS configuration and the QoE policy. As a result, the QoE performance at the wireless terminal can be assured.

In an embodiment, the QoE policy comprises at least one of:

- a QoE score target associated with at least one QoS flow or at least one service type;
- a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level;
- a priority of the at least one QoS flow or the at least one service type;
- a target guarantee indication, indicating whether the QoE policy must to be followed;
- a release indication, which indicates whether to release network resources (e.g. PDU session(s), QoS flow(s), service(s), application(s) or DRB(s)) associated with the QoE policy when the QoE policy cannot be followed;
- a release type indication, which indicates the network resources being released when the QoE policy cannot be followed.

In an embodiment, the wireless network node may further transmit QoE assistance information to the core network. The QoE assistance information comprises at least one of:

- a mapping list comprising at least one mapping pair of a QoE level and a QoS level;

at least one guaranteed QoE level, which indicates the at least one QoE level is guaranteed based on a radio quality (associated with the wireless terminal);

at least one guaranteed QoS level, which indicates at least one QoS level is guaranteed based on the radio quality.

In an embodiment, the QoE level is associated with at least one of: a QoE level identifier, a service type, a codec rate, a QoE Score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level.

In an embodiment, the QoS level includes at least one of a 5QI value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate.

In an embodiment, the at least one guaranteed QoE level is associated with at least one network slice. Similarly, the at least one guaranteed QoS level may be associated with at least one network slice. Note that the at least one network slice associated with the at least one guaranteed QoE level may be the same or different or overlap those associated with the at least one guaranteed QoS level.

In an embodiment, the QoS configuration and the QoE policy is transmitted from a CU of the wireless network node to a DU of the wireless network node.

In an embodiment, the wireless network node may determine a mapping list (i.e. QoE-QoS mapping list) comprising at least one mapping pair of a QoE level and a QoS level. For example, the wireless network node may receive QoE measurement report(s)/result(s) from the wireless terminal, collect QoS measurement result(s)/data of the wireless terminal and determine the mapping list based on the received QoE measurement report(s)/result(s) and the collected QoS measurement result(s)/data.

In an embodiment, the QoE level is associated with (e.g. comprises) at least one of: a QoE level identifier, a service type, a codec rate, a QoE score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level.

In an embodiment, the QoS level includes at least one of a 5QI value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate.

In an embodiment, the wireless network node determines a QoS level based on the QoE policy (e.g. QoE score target or QoE metrics target) and the mapping list comprising at least one mapping pair of a QoE level and a QoS level and determines a recommended QoS configuration based on the determined QoS level. The recommended QoS configuration may be used for performing the at least one data transmission based on the determined QoS level.

In an embodiment, the wireless network node may determine a recommended QoS configuration for a QoS flow or a service type based on a QoE score associated with the QoS flow or the service type and the QoE policy. In this embodiment, the QoE score is smaller than a QoE score target of the QoE policy and/or at least one QoE measurement result/report of the QoS flow or the service type is smaller than a QoE metrics target of the QoE policy. For example, the wireless network node may receive the QoE score and/or collect the QoE measurement result(s)/report(s) from the wireless terminal. In addition, the wireless network node may determine the QoE score based on the at least one QoE measurement result of the wireless terminal.

In an embodiment, the wireless network node may transmit the recommended QoS configuration for the QoS flow or the service type to the core network. In response to the recommended QoS configuration, the wireless network node receives at least one accepted QoS flow and/or at least one forbidden (e.g. not-allowed, not-accepted) QoS flow associated with the recommended QoS configuration. The wireless network node may reconfigure the QoS configuration of the accepted QoS flow based on the recommended QoS configuration. As an alternative or in addition, the wireless network node does not reconfigure the QoS configuration of the forbidden QoS flow based on the recommended QoS configuration. That is, the wireless network node may reconfigure the QoS configuration of the QoS flow which is not indicated as the forbidden QoS flow based on the recommended QoS configuration.

In an embodiment, the QoE score may be determined by the DU of the wireless network node and is transmitted to the CU of the wireless network node, to allow the CU of the wireless network node to determine the recommended QoS configuration and to transmit the recommended QoS configuration to the core network.

In an embodiment, the QoE score for a QoS flow or a service type is determined based on the QoE measurement result(s)/report(s) received from the wireless terminal. As an alternative, the QoE score may be directly received from the wireless terminal, the core network or a QoE server. The data transmission(s) between the wireless network node and the wireless terminal is performed based on the QoE score and the QoE policy.

In an embodiment, when the QoE score associated with a QoS flow or a service type is smaller than a QoE score target of the QoE policy or at least one QoE measurement result of the wireless terminal is smaller than a QoE metrics target of the QoE policy, the wireless network node may perform at least one of:

releasing at least one network resources (e.g. PDU session(s), QoS flow(s), DRB(s)) associated with the QoE score or the at least one QoE measurement result (or the associated QoS flow or the associated service type), or transmitting, to the core network, information of the at least one network resource (e.g. PDU session(s), QoS flow(s), DRB(s)) associated with the QoE score or the at least one QoE measurement result (or the associated QoS flow or the associated service type).

In this embodiment, the information of the at least one network resource associated with the QoE score or the at least one QoE measurement result is transmitted from the DU of the wireless network node to the CU of the wireless network node. The CU transmits the information of the at least one network resource associated with the QoE score or the at least one QoE measurement result to the core network.

In an embodiment, the at least one data transmission between the wireless network node and the wireless terminal is reconfigured by the DU of the wireless network node.

In an embodiment, the QoE score is determined by the DU of the wireless network node.

In an embodiment, the QoE score is determined by the CU of the wireless network node and is transmitted from the CU to the DU.

In an embodiment, the QoE score is received by the DU of the wireless network node from the wireless terminal, a QoE server or the core network.

In an embodiment, the QoE score is received by the CU of the wireless network node from the wireless terminal, the QoE server or the core network.

In an embodiment, the wireless network node determines a QoE score of a service type (e.g. video streaming service) based on QoE measurement results received from the wireless terminal. Based on the determined QoE score, the wireless network node determines at least one configuration (e.g. encode rate, allocated bandwidth) associated with the service type and transmits the at least one configuration to the wireless terminal or directly to a service of the service type.

Figure 11:
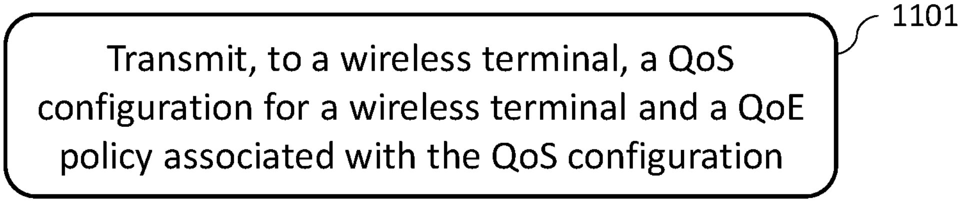
FIG. 11 shows a flowchart of a method according to an embodiment of the present disclosure.

FIG. 11 shows a schematic diagram of a method according to an embodiment of the present disclosure. The method shown in FIG. 11 may be used in a core network (e.g. 5GC or a wireless device performing or comprising the functionalities of the 5GC) and comprises the following step:

Step 1101: Transmit, to a wireless network node, a QoS configuration for a wireless terminal and a QoE policy associated with the QoS configuration.

In FIG. 11, the core network transmits a QoS configuration for a wireless terminal and a QoE policy associated with the QoS configuration to a wireless network node (e.g. gNB, RAN node). In an embodiment, the QoE policy is associated with the wireless terminal. As an alternative or in addition, the QoE policy is associated with PDU session(s), QoS flow(s), service(s) or application(s) of the wireless terminal. The data transmissions between the wireless network node and the wireless terminal are performed based on the received QoS configuration and the QoE policy. As a result, the QoE performance at the wireless terminal can be assured.

In an embodiment, the QoE policy comprises at least one of:

- a QoE score target associated with at least one QoS flow or at least one service type;
- a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level;
- a priority of the at least one QoS flow or the at least one service type;
- a target guarantee indication, indicating whether the QoE policy must to be followed;
- a release indication, which indicates whether to release network resources (e.g. PDU session(s), QoS flow(s), service(s), application(s) or DRB(s)) associated with the QoE policy when the QoE policy cannot be followed;
- a release type indication, which indicates the network resources being released when the QoE policy cannot be followed.

In an embodiment, the core network may receive QoE assistance information from the wireless network node. The QoE assistance information comprises at least one of:

- a mapping list comprising at least one mapping pair of a QoE level and a QoS level;
- at least one guaranteed QoE level, which indicates the at least one QoE level is guaranteed based on a radio quality (associated with the wireless terminal);
- at least one guaranteed QoS level, which indicates at least one QoS level is guaranteed based on the radio quality.

In an embodiment, the QoE level is associated with at least one of: a QoE level identifier, a service type, a codec rate, a QoE Score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level.

In an embodiment, the QoS level includes at least one of a 5QI value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate.

In an embodiment, the at least one guaranteed QoE level is associated with at least one network slice. Similarly, the at least one guaranteed QoS level is associated with at least one network slice. Note that the at least one network slice associated with the at least one guaranteed QoE level may be the same or different or overlap those associated with the at least one guaranteed QoS level.

In an embodiment, the core network may receive recommended QoS configuration for the QoS flow or the service type from the wireless network node. In response to the recommended QoS configuration, the core network transmits at least one accepted QoS flow and/or at least one forbidden (e.g. not-allowed, not-accepted) QoS flow which is associated with or for the recommended QoS configuration, e.g., to indicate the QoS flow(s) which can/should/shall adopt the recommended QoS configuration.

In an embodiment, the core network transmits a QoE score of a QoS flow or a service type to the wireless network node.

In an embodiment, when the wireless network determines that a QoE score associated with a QoS flow or a service type is smaller than a QoE score target of the QoE policy or at least one QoE measurement result of the wireless terminal is smaller than a QoE metrics target of the QoE policy, the core network may receive information of at least one network resource (e.g. PDU session(s), QoS flow(s), DRB(s)) associated with the QoE score or the at least one QoE measurement result (i.e. the QoS flow or the service type corresponding to the QoE score or the at least one QoE measurement result). Based on the received information, the core network releases the at least one network resources (e.g. PDU session(s), QoS flow(s), DRB(s)) associated with the QoE score or the at least one QoE measurement result.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in a wireless network node, the method comprising:

receiving, from a core network, a quality of service (QoS) configuration for a wireless terminal and a quality of experience (QoE) policy associated with the QoS configuration, wherein at least one data transmission between the wireless network node and the wireless terminal is performed based on the QoS configuration and the QoE policy, wherein the QoE policy comprises a target guarantee indication, indicating whether a QoE target of the QoE policy is a hard limit that must be guaranteed or is a target to be fulfilled as much as possible.

2. The wireless communication method of claim 1, wherein the QoE policy comprises at least one of:

a QoE score target associated with at least one QoS flow or at least one service type, a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level, a priority of the at least one QoS flow or the at least one service type, a release indication, which indicates whether to release network resources associated with the QoE policy when the QoE policy cannot be followed, or a release type indication, which indicates the network resources being released when the QoE policy cannot be followed.

3. The wireless communication method of claim 1, further comprising:

transmitting, to the core network, QoE assistance information.

4. The wireless communication method of claim 3, wherein the at least one guaranteed QoE level is associated with at least one network slice, wherein the at least one guaranteed QoS level is associated with at least one network slice, and the method further comprising transmitting, from a central unit of the wireless network node to a distributed unit of the wireless network node, the QoS configuration and the QoE policy.

5. The wireless communication method of claim 1, further comprising:

determining a mapping list comprising at least one mapping pair of a QoE level and a QoS level, wherein the QoE level is associated with at least one of: a QoE level identifier, a service type, a codec rate, a QoE score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level, and wherein the QoS level includes at least one of a 5G QoS identifier, 5QI, value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate.

6. The wireless communication method of claim 1, further comprising:

determining a QoS level based on the QoE policy and a mapping list comprising at least one mapping pair of a QoE level and a QoS level, and determining a recommended QoS configuration based on the determined QoS level, wherein the recommended QoS configuration is used for performing the at least one data transmission.

7. The wireless communication method of claim 1, further comprising:

determining a recommended QoS configuration for a QoS flow or a service type based on a QoE score associated with the QoS flow or the service type and the QoE policy when the QoE score is smaller than a QoE score target of the QoE policy or at least one QoE measurement result received from the wireless terminal is smaller than a QoE metrics target of the QoE policy, wherein the QoE score associated with the QoS flow or the service type is determined based on the at least one QoE measurement result of the wireless terminal;

transmitting, to the core network, the recommended QoS configuration for the QoS flow or the service type; and receiving, from the core network, at least one accepted QoS flow for the recommended QoS configuration.

8. The wireless communication method of claim 7, wherein the QoE score is determined by a distributed unit of the wireless network node and transmitted from the distributed unit to a central unit of the wireless network node, and wherein the recommended QoS configuration is determined by the central unit, or wherein the QoE score and the recommend QoS configuration are determined by a distributed unit of the wireless network node and transmitted from the distributed unit to a central unit of the wireless network node, and wherein the central unit transmits the recommended QoS configuration to the core network.

9. The wireless communication method of claim 1, further comprising:

determining a QoE score of a QoS flow or a service type based on QoE measurement results received from the wireless terminal, or receiving, from the wireless terminal, a QoE server or the core network, the QoE score of the QoS flow or the service type, and wherein at least one data transmission between the wireless network node and the wireless terminal is reconfigured based on the QoE score and the QoE policy.

10. The wireless communication method of claim 1, wherein a QoE score associated with a QoS flow or a service type is smaller than a QoE score target of the QoE policy or at least one QoE measurement result of the wireless terminal is smaller than a QoE metrics target of the QoE policy, wherein the method further comprises:

releasing at least one network resource associated with the QoE score or the at least one QoE measurement result, or transmitting, to the core network, information of the at least one network resource associated with the QoE score or the at least one QoE measurement result, wherein the at least one network resource comprises at least one of a QoS flow, a protocol data unit session, or a data resource block, wherein the information of the at least one network resource associated with the QoE score or the at least one QoE measurement result is transmitted from a distributed unit of the wireless network node to a central unit of the wireless network node, and wherein the central unit transmits the information of the at least one network resource associated with the QoE score or the at least one QoE measurement result to the core network.

11. The wireless communication method of claim 10, wherein the at least one data transmission between the wireless network node and the wireless terminal is reconfigured by a distributed unit of the wireless network node, and wherein:

the QoE score is determined by the distributed unit of the wireless network node, the QoE score is determined by a central unit of the wireless network node and is transmitted from the central unit to the distributed unit, the QoE score is received by the distributed unit of the wireless network node from the wireless terminal, a QoE server or the core network, or the QoE score is received by the central unit of the wireless network node from the wireless terminal, the QoE server or the core network.

12. The wireless communication method of claim 1, further comprising:

determining a QoE score of a service type based on QoE measurement results received from the wireless terminal;

determining at least one configuration associated with the service type based on the QoE score and the QoE policy and transmitting, to the wireless terminal or a server of the service type, the at least one configuration, wherein the at least one configuration comprises at least one of an encode rate or an allocated bandwidth.

13. A wireless communication method for use in a core network, the method comprising:

transmitting, to a wireless network node, a quality of service (QoS) configuration for a wireless terminal and a quality of experience (QoE) policy associated with the QoS configuration, wherein at least one data transmission between the wireless network node and the wireless terminal is performed based on the QoS configuration and the QoE policy, wherein the QoE policy comprises a target guarantee indication, indicating whether a QoE target of the QoE policy is a hard limit that must be guaranteed or is a target to be fulfilled as much as possible.

14. The wireless communication method of claim 13, wherein the QoE policy comprises at least one of:

a QoE score target associated with at least one QoS flow or at least one service type, a QoE metrics target associated with the at least one QoS flow or the at least one service type, wherein the QoE metrics target is associated with at least one of a round-trip time, a jitter duration, a corruption duration, a throughput, an initial playout delay for video, a video resolution, or a buffer occupancy level, a priority of the at least one QoS flow or the at least one service type, a release indication, which indicates whether to release network resources associated with the QoE policy when the QoE policy cannot be followed, or a release type indication, which indicates the network resources being released when the QoE policy cannot be followed.

15. The wireless communication method of claim 13, further comprising:

receiving, from the wireless network node, QoE assistance information, wherein the QoE assistance information comprises at least one of:

a mapping list comprising at least one mapping pair of a QoE level and a QoS level, wherein the QoE level is associated with at least one of: a QoE level identifier, a service type, a codec rate, a QoE Score, a QoE metrics range, a maximum QoE metric, a minimum QoE metric, an average QoE metric, wherein the QoE metrics comprises at least one of a round-trip time, a jitter duration, a corruption duration, a throughput, an initial playout delay for video, a video resolution, a buffer occupancy level, and wherein the QoS level includes at least one of a 5G QoS identifier, 5QI, value, a QoS level identifier, a service type, a packet delay range, a maximum packet delay, a minimum packet delay, an average packet delay, a packet error rate range, a maximum packet error rate, a minimum packet error rate, an average packet error rate, a packet loss rate range, a maximum packet loss rate, a minimum packet loss rate, an average packet loss rate, a guaranteed flow bit rate range, a maximum guaranteed flow bit rate, a minimum guaranteed flow bit rate, or an average guaranteed flow bit rate;

at least one guaranteed QoE level, which indicates the at least one QoE level is guaranteed based on a radio quality, or at least one guaranteed QoS level, which indicates at least one QoS level is guaranteed based on the radio quality.

16. The wireless communication method of claim 15, wherein the at least one guaranteed QoE level is associated with at least one network slice, wherein the at least one guaranteed QoS level is associated with at least one network slice.

17. The wireless communication method of claim 13, further comprising:

receiving, from the wireless network node, the recommended QoS configuration for a QoS flow or a service type;

transmitting, to the wireless network node, at least one accepted QoS flow for the recommended QoS configuration.

18. The wireless communication method of claim 13, further comprising:

transmitting, to the wireless network node, a QoE score of a QoS flow or a service type.

19. The wireless communication method of claim 13, further comprising:

receiving, from the wireless network node, information of at least one network resource associated with a QoE score or at least one QoE measurement result, and releasing the at least one network resources associated with the QoE score or the at least one QoE measurement result, wherein the at least one network resource comprises at least one of a QoS flow, a protocol data unit session, or a data resource block.

20. A wireless network node, comprising:

a communication unit, configured to receive, from a core network, a quality of service (QoS) configuration for a wireless terminal and a quality of experience (QoE) policy associated with the QoS configuration, wherein at least one data transmission between the wireless network node and the wireless terminal is performed based on the QoS configuration and the QoE policy, wherein the QoE policy comprises a target guarantee indication, indicating whether a QoE target of the QoE policy is a hard limit that must be guaranteed or is a target to be fulfilled as much as possible.

* * * * *